M. T. CHAPMAN.
WELL SINKING APPARATUS.
APPLICATION FILED FEB. 12, 1912.
1,114,231.
Patented Oct. 20, 1914.
5 SHEETS—SHEET 1.
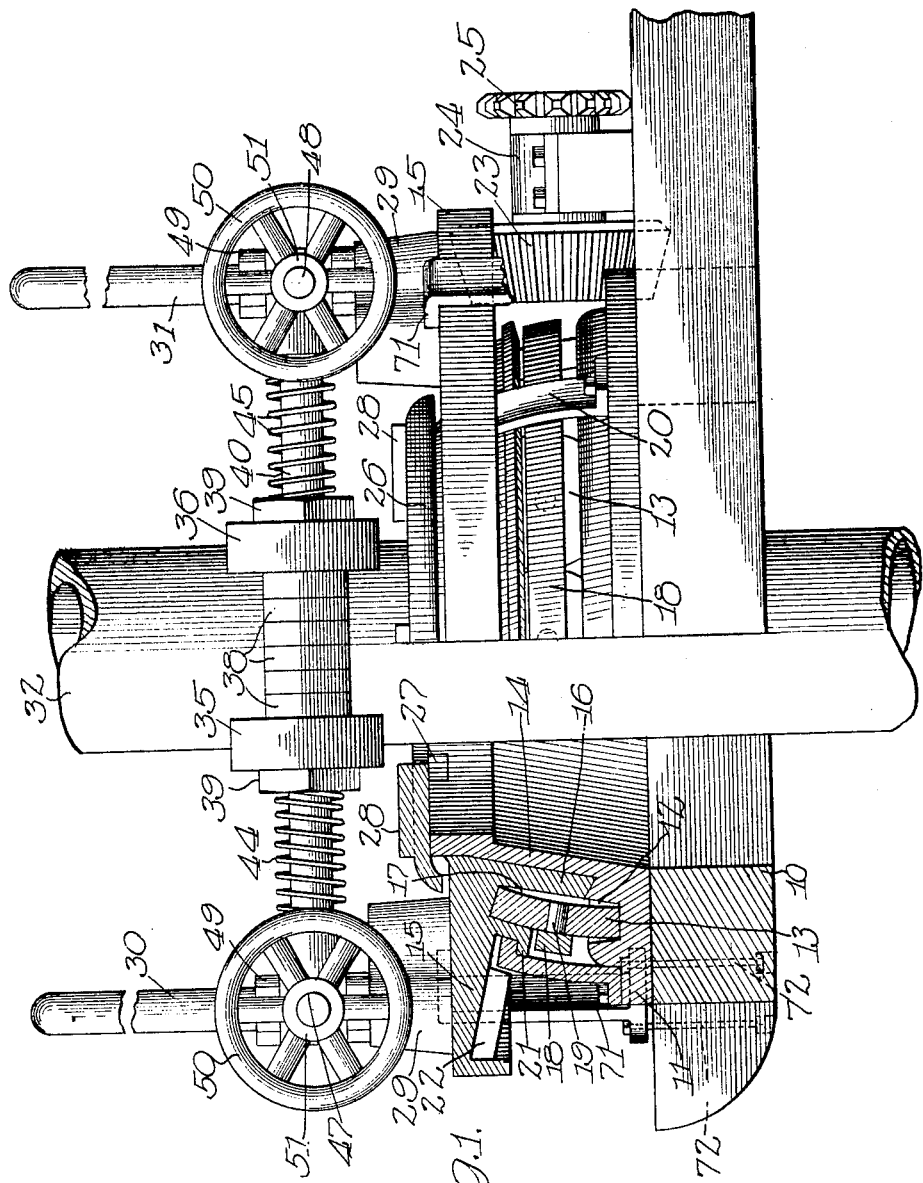
Witnesses:
Inventor:
Matthew T. Chapman, M. T. CHAPMAN.
WELL SINKING APPARATUS.
APPLICATION FILED FEB. 12, 1912.
1,114,231.
Patented Oct. 20, 1914
5 SHEETS—SHEET 2.
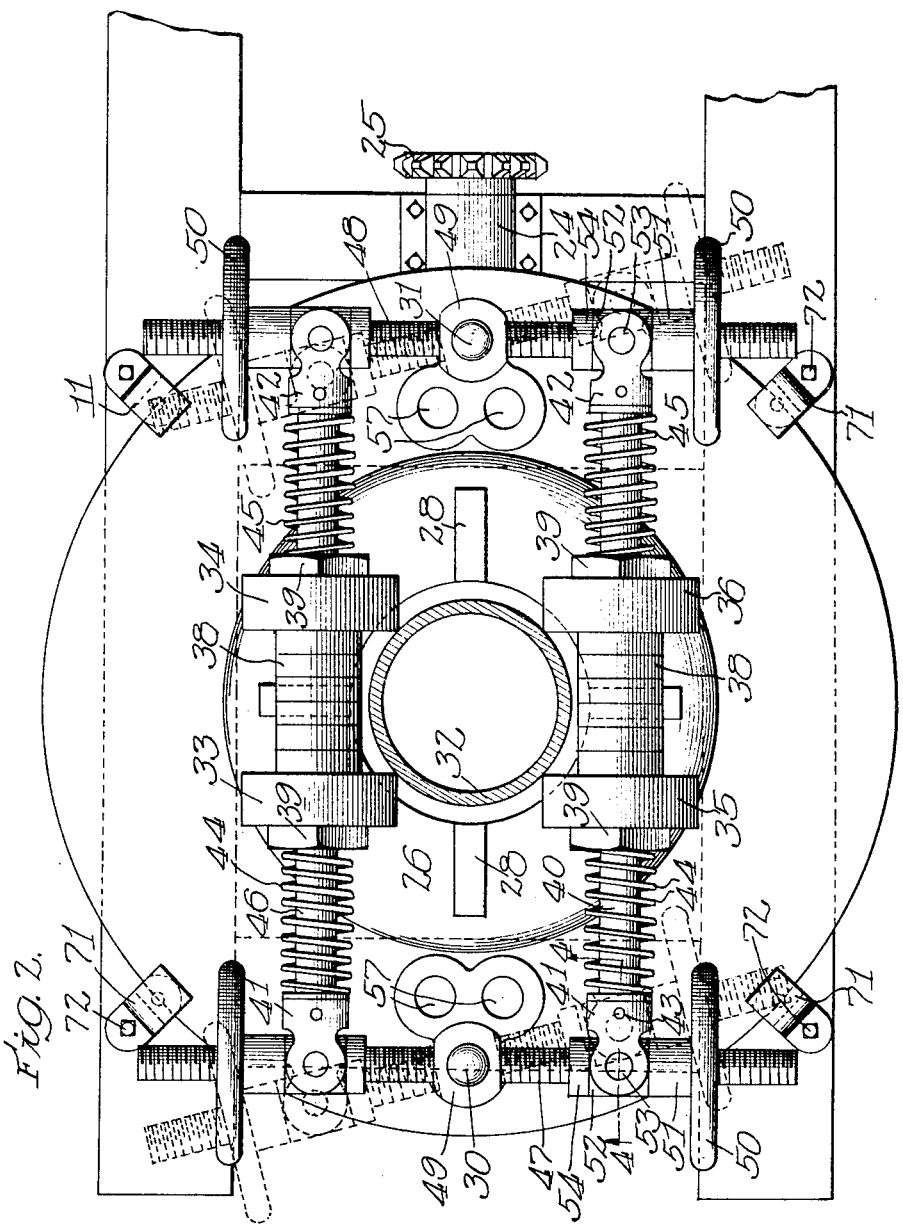

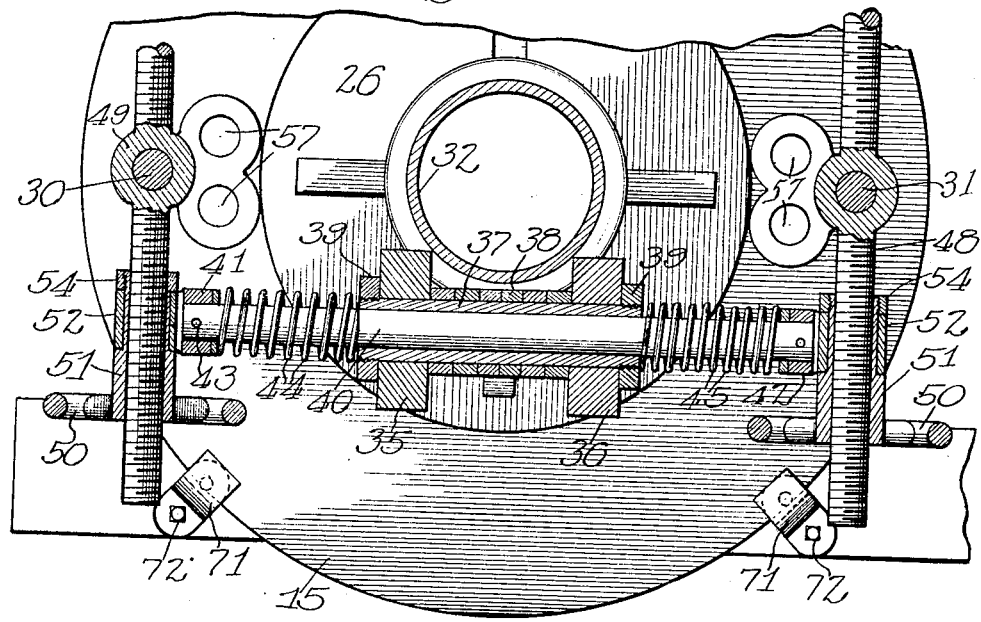
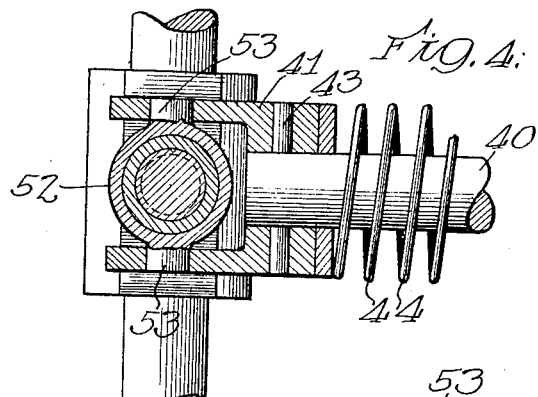
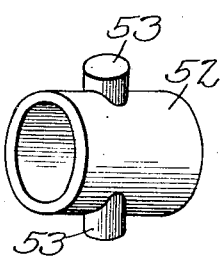

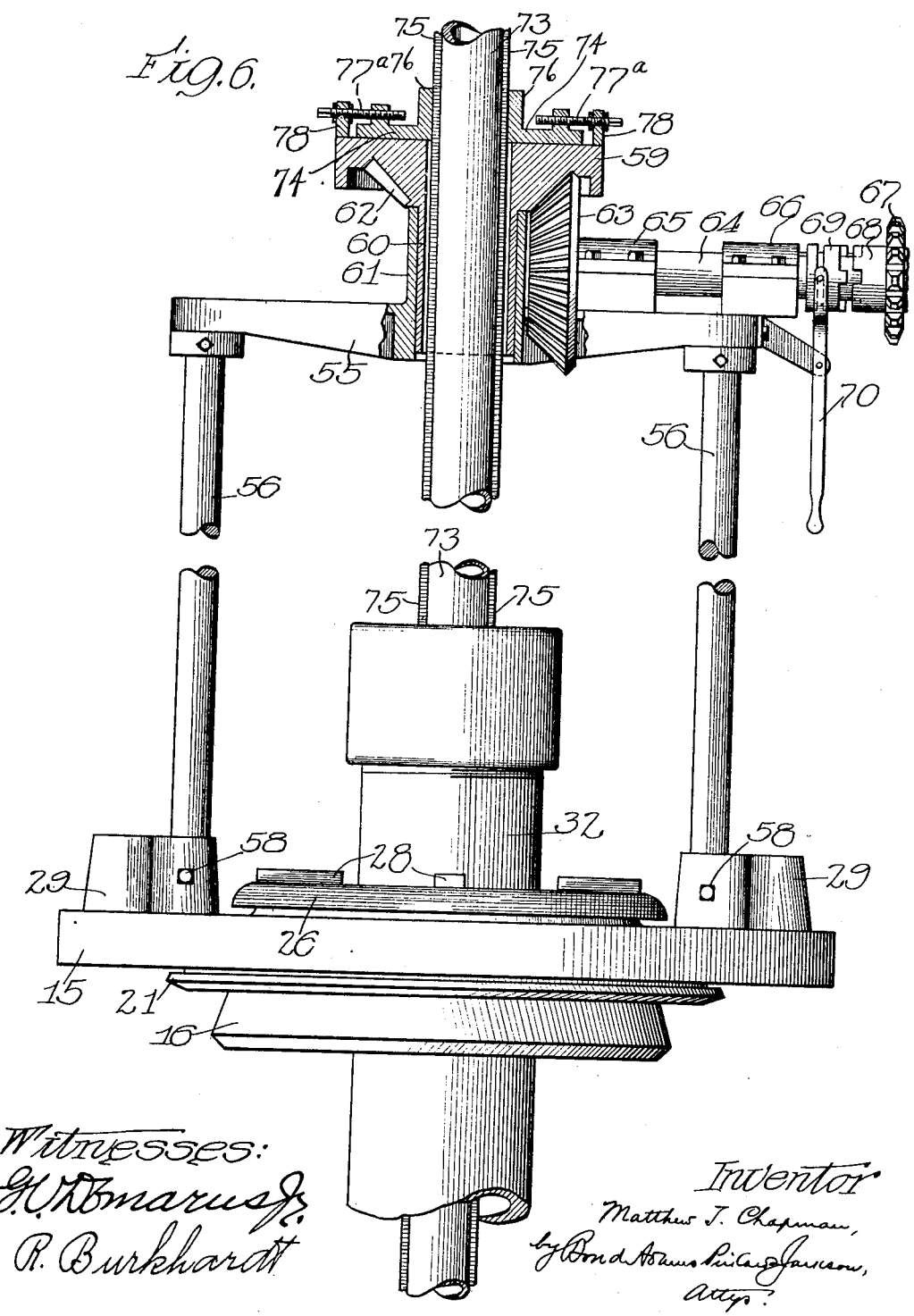

M. T. CHAPMAN.
WELL SINKING APPARATUS.
APPLICATION FILED FEB. 12, 1912.
1,114,231.
Patented Oct. 20, 1914.
5 SHEETS—SHEET 5.
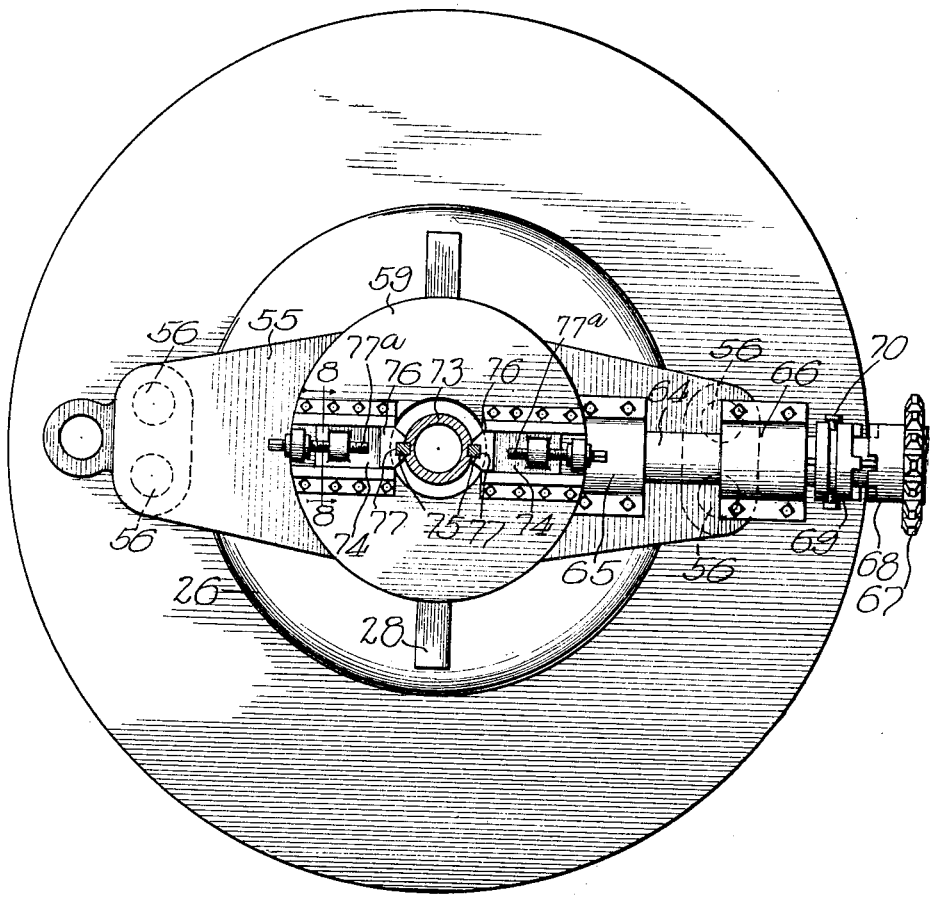
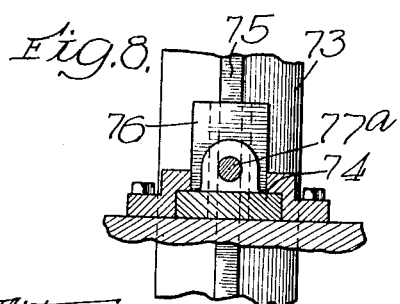
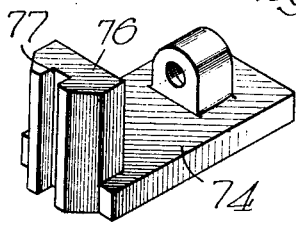
Witnesses:
G. W. Domarus Jr.
R. Burkhardt.
Inventor:
Matthew T. Chapman,
by Bond Adams Pickard & Jackson
Attys.

UNITED STATES PATENT OFFICE.

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

WELL-SINKING APPARATUS.

1,114,231. Specification of Letters Patent. Patented Oct. 20, 1914.

Application filed February 12, 1912. Serial No. 676,934.

*To all whom it may concern:*

Be it known that I, MATTHEW T. CHAPMAN, a citizen of the United States, residing at Aurora, in the county of Kane and State of Illinois, have invented certain new and useful Improvements in Well-Sinking Apparatus, of which the following is a specification, reference being had to the accompanying drawings.

My invention relates to well-sinking apparatus, and has principally for its objects to provide improved means by which the tube will be automatically gripped more strongly for rotating it when greater resistance is encountered in boring, and to provide auxiliary boring mechanism in the form of a comparatively high speed drilling mechanism for use on hard rock which cannot be effectively bored by the main drilling mechanism.

My invention also comprises certain other improvements which will be hereinafter pointed out.

In the accompanying drawings,—Figure 1 is a side view of the main boring mechanism, some parts being in section; Fig. 2 is a plan view of the parts shown in Fig. 1; Fig. 3 is a detail, being a partial plan view illustrating in section certain parts of the main drill operating mechanism; Fig. 4 is an enlarged detail, being a partial sectional view on line 4—4 of Fig. 2; Fig. 5 is a perspective view of one of the sleeves which connect the shafts which carry the gripping devices with the shafts by which the position of such gripping devices is adjusted; Fig. 6 is a side view, partly in section, illustrating the construction and arrangement of the auxiliary boring mechanism; Fig. 7 is a plan view of the parts shown in Fig. 6; Fig. 8 is an enlarged detail, being a cross-section on line 8—8 of Fig. 7; and Fig. 9 is a perspective view of one of the sliding clamps by which the drill is connected with the auxiliary operating mechanism.

Referring to the drawings,—10 indicates a base or support, preferably made of timbers in the usual way, and of suitable dimensions and shape to support the turntable and other parts that are carried by it.

11 indicates the lower member of a turntable which is fixedly secured to the base 10 and is provided with a runway 12 to receive anti-friction rollers 13 which support the upper or rotary member of a turntable. The base 11 is also provided with an upwardly-projecting annular flange 14 at the center which is of suitable internal diameter to admit the largest sized pipes or tubes.

15 indicates the upper member of the turntable, which is fitted upon the lower member, having a downwardly-projecting annular flange 16 which bears against the outer surface of the flange 14, as shown in Fig. 1. The rotary member 15 of the turntable also is provided with a runway 17 on its under side to receive the anti-friction rollers 13. Said runway, however, is of somewhat less diameter than the runway 12 so that the rollers 13 are inclined inward at their upper margins, as shown in Fig. 1. Said rollers are made conical to bear properly in the runways 12 and 17. The several rollers 13 are set close together all the way around the turntable and are held in position by a ring 18 which extends around them and is connected to each roller by a pin 19, as shown in Fig. 1.

20 indicates a series of clamps for holding the upper member 15 of the turntable down in position, said clamps being in the form of hooks which engage an annular flange 21 on the under side of the rotary member 15, as shown in Fig. 1.

22 indicates an annular rack on the under side of the rotary member 15, which rack engages a gear 23 mounted on a suitable shaft journaled in bearings 24 at one side of the base 10. Said shaft also carries a sprocket-wheel 25 by means of which it is driven from any suitable source of power and through which power is communicated to the rotary member 15 of the turntable.

26 indicates a cap-plate, which is adapted to fit on the flange 14 of the stationary member of the turntable to reduce the size of the opening when small sized pipes are used. Said cap-plate is provided with lugs 27 adapted to fit in notches in the flange 14 so as to hold it against rotation, and it is also provided with lugs 28 on its upper surface to engage the mechanism ordinarily employed for holding the pipe or tube against rotation when uncoupling sections thereof. The purpose of using the cap-plate 26 is to partly close the opening around the pipe to prevent workmen from dropping tools, etc., into the well. The internal diameter of the cap-plate is, of course, large enough to permit of the passage of the coupling joints of the pipe.

29 indicates bosses which rise from the upper surface of the turntable at diametrically opposite points, as shown in Fig. 1, and serve to support bars 30—31 which are secured in said bosses at their lower ends and rise from the turntable, as shown in Figs. 1 and 2. The bars 30—31 serve to support and guide the main gripping mechanism by which the pipe is engaged and clamped for rotating it.

32 indicates the well-tube, which, as shown in Figs. 1 and 2, passes through the opening in the cap-plate 26.

33—34 and 35—36 indicate two pairs of gripping disks arranged at opposite sides of the well or boring tube 32 for gripping the same in rotating it. The two pairs of gripping devices are similarly mounted, and it will, therefore, be necessary only to describe one in detail, it being understood that the construction and arrangement of the other are similar. As best shown in Fig. 3, the disks 35—36 are mounted upon a sleeve 37, being spaced apart by a series of collars 38 placed between them on said sleeve, the disks being clamped up against the intermediate collars by nuts 39 screwed upon the ends of the sleeve. Thus the gripping disks 35—36 may be set different distances apart by varying the number or width of the several collars 38. The sleeve 37 is mounted upon a shaft 40, the ends of which are provided with yokes 41—42 fixedly secured thereto, preferably by bolts 43. Springs 44—45 between the yokes 41—42 and the adjoining ends of the sleeves 37 serve to normally center the sleeve upon the shaft 40, but permit endwise movement of said sleeve upon the shaft, as may be necessary in the operation of the machine. The gripping disks 33—34 are similarly mounted upon a corresponding shaft 46, as shown in Fig. 2,—the corresponding parts being indicated by the same reference numbers. The yokes 41—42 serve to connect the shafts 40—46 with shafts 47—48 at the opposite ends of said shafts 40—46 and normally arranged perpendicularly thereto. The shafts 47—48 are provided centrally with bosses 49 which fit upon the bars 30—31 so as to rock and also to move longitudinally thereupon. The ends of the shafts 47—48 are screw-threaded, as shown in Figs. 2 and 3, and carry at their opposite ends hand-wheels 50 having hubs 51 which screw upon the shafts 47—48. The hubs 51 also have pivoted upon them sleeves 52 provided with trunnions 53 adapted to receive the members of the yokes 41—42. The sleeves 52 being pivoted upon the hubs 51, it will be apparent that they, together with the yokes 41—42 serve to connect the shafts 40—46 with the shafts 47—48 in such manner that the adjustment of the hand-wheels upon their respective shafts is not interfered with, and, moreover, the shafts 47—48 may be moved to an angular position with reference to the shafts 40—46, as indicated by dotted lines in Fig. 2. The sleeves 52 are held upon the hubs 51 by nuts 54, as best shown in Fig. 3.

In the ordinary operation of the boring mechanism, the shafts 40—46 are perpendicular to the shafts 47—48 and the gripping devices are at the centers of their respective shafts. When, however, rock which presents extraordinary resistance is encountered, the extraordinary pull of the bars 30—31 upon the shafts 40—46 through the shafts 47—48 tends to change the relation of the several shafts from that of a rectangle to that of a rhomboid, thereby drawing the shafts 40—46 closer together and consequently causing the gripping disks 33—34—35—36 to bite more deeply into the well or boring tube. Of course, this action causes the gripping devices to move longitudinally upon their respective shafts, this being provided for by mounting them upon the sleeves 37, as described. This longitudinal movement of the gripping devices is also advantageous in that it permits the gripping devices to automatically adjust themselves to maintain their proper biting engagement with the boring-tool as it descends into the well, even though it should get out of proper alinement with the bore of the well. When the extraordinary strain is removed the several shafts return to their original position and the gripping devices are again centered by the springs 44—45. Thus the slipping of the gripping devices on the well or boring tube under extraordinary strain is prevented, the requisite increase in the gripping force being automatically secured and regulated by the necessities of the work. This automatic regulation of the force of the grip upon the well-tube is advantageous not only because it prevents the slipping of the gripping devices but also because it avoids the necessity of maintaining a strong grip at all times and does not interfere with the freedom of movement of the well-tube through the gripping devices.

The auxiliary gripping or clamping devices hereinbefore referred to are best shown in Figs. 6 to 9. As shown in Fig. 6, 55 indicates a cross-head or platform, which is carried at the upper end portions of posts 56, preferably four in number, which rise from the bosses 29, as shown in Figs. 6 and 7. The posts 56 are removably secured in suitable sockets 57 provided in the bosses 29, as shown in Fig. 2, being held in place by setscrews 58 so that they may readily be removed when desired. The table 55 carries a turntable 59 provided with a downwardly-projecting sleeve 60 which is journaled in an upwardly-projecting flange 61 carried by the table 55, as shown in Fig. 6. The turntable 59 has a gear 62 at its under side which meshes with a gear 63 mounted on a shaft 64 carried by the turntable in suitable bearings 65—66. 67. indicates a sprocket-wheel carried by a sleeve 68 loosely mounted on the shaft 64 and adapted to be operatively connected therewith by a clutch 69 operated by a lever 70. By this means the shaft 64 and turntable 59 may be rotated from the sprocket-wheel 67. The latter wheel is placed so that it may be readily connected by a chain or link belt with the same source of power that drives the sprocket-wheel 25 which drives the main turntable. The main turntable is, of course, not rotated when the auxiliary rotating mechanism is employed. For the purpose of holding the main turntable, or rather the rotary member 15 thereof, stationary when the auxiliary operating mechanism is employed, I employ clamps 71 secured to the base 10 by bolts 72, or other suitable means, preferably four of such clamps being used. At such times also the sprocket-wheel 25 is disconnected from the source of power by removing the chain that drives it.

The turntable 59 is employed for rotating a boring-tool 73 of comparatively small diameter at a high rate of speed, and to that end is provided with clamps 74 which are adapted to non-rotatably engage the boring-tool 73. In the construction shown the tool 73 is provided with keys 75 at opposite sides thereof, and the clamps 74 are provided with blocks 76 having notches 77 which receive the keys 75, thereby non-rotatably engaging the same but permitting longitudinal movement of the tool 73 through the blocks 76. The clamps 74 are movable toward and from the tool 73 by adjusting screws 77ᵃ mounted in the brackets 78 carried by the turntable 59. Thus the tool 73 may be clamped or released at pleasure. When the auxiliary rotating mechanism is employed the bars 30—31 upon which the main gripping mechanism is mounted are removed with the main gripping mechanism, and, as above explained, the upper member of the main turntable is secured in a stationary position. The boring-tool 73 may then be driven at a high speed to bore through refractory rock, after which the boring may be continued by employing the main boring devices. Ordinarily, however, the main boring mechanism is employed to sink large pipes through the first alluvial soil and such materials as can be bored with drills in the ordinary manner, and then the auxiliary boring mechanism is employed to bore through the more refractory rock. The use of the anti-friction rollers having their upper portions inclined inwardly to support the rotary member of the turntable is advantageous as they brace it and operate more efficiently to hold it in position.

So far as I am aware, I am the first in the art to provide a turntable with gripping mechanism comprising separated disks or equivalent devices for engaging and rotating a round pipe and arranged to automatically move both disks toward the boring-tool to increase the action of the gripping mechanism to compensate for increased resistance to boring. I also believe I am the first to provide gripping devices of the type described movable longitudinally upon the shafts which carry them to permit the shafts to be moved closer together to increase the gripping action. I also believe myself to be the first to provide main pipe rotating mechanism with auxiliary pipe rotating mechanism adapted to be driven at a higher speed, for the purposes described. These features, therefore, are claimed generically.

That which I claim as my invention, and desire to secure by Letters Patent, is,—

1. A well-sinking apparatus, comprising a turntable, gripping devices composed of separated disks adapted to engage a round boring-tool for rotating the same, and means connecting said gripping devices with the turntable and acting to automatically move said disks toward the boring-tool, to increase the force of the grip when the boring-tool encounters extraordinary resistance.

2. A well-sinking apparatus, comprising a turntable having an opening for the passage of a boring-tool, gripping devices at opposite sides of said passage for engaging opposite sides of the boring-tool, each of said gripping devices consisting of separated disks, and means connecting the said gripping devices with the turntable and acting to move the opposite pairs of gripping disks closer to the boring-tool when the boring-tool encounters extraordinary resistance.

3. A well-sinking apparatus, comprising a turntable having an opening for the passage of a boring-tool, shafts at opposite sides of said opening, gripping devices mounted on said shafts and adapted to engage the boring-tool for rotating the same, and means carried by the turntable and acting to move said shafts closer together when the boring-tool encounters extraordinary resistance, said gripping devices being movable longitudinally upon their respective shafts.

4. A well-sinking apparatus, comprising a turntable having an opening for the passage of a boring-tool, shafts at opposite sides of said opening, gripping devices mounted on said shafts and adapted to engage the boring-tool for rotating the same, means carried by the turntable and acting to move said shafts closer together when the boring-tool encounters extraordinary resistance, said gripping devices being movable longitudinally upon their respective shafts, and springs for normally holding the gripping devices in position upon their respective shafts.

5. A well-sinking apparatus, comprising a turntable having an opening for the passage of a boring-tool, shafts at opposite sides of said opening, sleeves mounted on said shafts and movable longitudinally thereof, gripping devices mounted on said sleeves, and means connecting said shafts with the turntable.

6. A well-sinking apparatus, comprising a turntable having an opening for the passage of a boring-tool, shafts at opposite sides of said opening, sleeves mounted on said shafts and movable longitudinally thereof, gripping devices mounted on said sleeves, means connecting said shafts with the turntable, and springs on said shafts for normally holding said gripping devices in position.

7. A well-sinking apparatus, comprising a turntable having an opening for the passage of a boring-tool, shafts at opposite sides of said opening, gripping devices mounted on said shafts and movable longitudinally thereof for gripping said boring-tool, and shafts pivotally connected with the turntable and with said first-mentioned shafts, the several shafts normally forming a rectangular figure and being adapted to form a rhomboid when the boring-tool encounters extraordinary resistance.

8. A well-sinking apparatus, comprising a turntable having an opening for the passage of a boring-tool, shafts at opposite sides of said opening, gripping devices mounted on said shafts for gripping said boring-tool, shafts pivotally connected with the turntable and with said first-mentioned shafts, the several shafts normally forming a rectangular figure and being adapted to form a rhomboid when the boring-tool encounters extraordinary resistance, and springs on said shafts at opposite sides of the gripping devices carried thereby.

9. A well-sinking apparatus, comprising a turntable having an opening for the passage of a boring-tool, posts at opposite sides of said passage, shafts pivotally mounted between their ends on said posts, gripping shafts pivotally connected with the end portions of said first-mentioned shafts, sleeves mounted on said gripping shafts and movable longitudinally thereof, and gripping devices mounted on said sleeves.

10. A well-sinking apparatus, comprising a turntable having an opening for the passage of a boring-tool, posts at opposite sides of said passage, shafts pivotally mounted between their ends on said posts, gripping shafts pivotally connected with the end portions of said first-mentioned shafts, sleeves mounted on said gripping shafts and movable longitudinally thereof, gripping devices mounted on said sleeves, and springs for centering said sleeves.

11. A well-sinking apparatus, comprising a turntable having an opening for the passage of a boring-tool, posts mounted on said turntable, shafts pivoted between their ends upon said posts, hand-wheels having hubs screwed upon the end portions of said shafts, trunnion, sleeves mounted on said hubs, shafts having yokes pivoted upon said trunnions, and gripping devices carried by the latter shafts.

12. In a well sinking apparatus, the combination of a turntable, means for rotating said turntable, gripping mechanism removably mounted on said turntable for gripping a boring tool to rotate it, auxiliary gripping means adapted to be applied to said turntable, and means for rotating said last-named gripping means.

13. A well-sinking apparatus, comprising a turntable, gripping mechanism mounted thereon for gripping a boring-tool to rotate it, means for securing said turntable against rotation, auxiliary gripping mechanism adapted to be applied to said turntable for engaging and rotating a boring-tool, and means for rotating the auxiliary gripping mechanism independently of said turntable.

14. A well-sinking apparatus, comprising a turntable, gripping mechanism mounted thereon and rotating therewith for gripping a boring-tool to rotate it, and auxiliary gripping mechanism adapted to be applied to said turntable for engaging and rotating a boring-tool, said auxiliary gripping mechanism being adapted to rotate independently of said turntable.

15. A well-sinking apparatus, comprising a turntable, gripping mechanism mounted thereon and rotating therewith for gripping a boring-tool to rotate it, and auxiliary gripping mechanism adapted to be applied to said turntable for engaging and rotating a boring-tool, said auxiliary gripping mechanism being adapted to rotate independently of said turntable and comprising members adapted to non-rotatably engage a boring-tool, meanwhile permitting endwise movement thereof.

16. In a well sinking apparatus, the combination of a turntable, means for rotating said turntable, gripping mechanism removably mounted on said turntable for gripping a boring tool to rotate it, means for holding said turntable against rotation, an auxiliary turntable adapted to be removably mounted on said first-mentioned turntable, gripping mechanism mounted on said auxiliary turntable, and means for rotating said auxiliary turntable.

17. A well-sinking apparatus, comprising a turntable, gripping mechanism removably mounted thereon for gripping a boring-tool to rotate it, removable posts adapted to be applied to said turntable, a table supported by said posts, gripping mechanism mounted on the latter table, and means for rotating the latter gripping mechanism.

18. A well-sinking apparatus, comprising a turntable consisting of a stationary lower member having an upwardly-projecting annular flange, an upper rotary member fitting around said flange, and a cap-plate resting on said flange and non-rotatably connected therewith.

19. A well-sinking apparatus, comprising a turntable consisting of a stationary lower member having an upwardly-projecting annular flange, an upper rotary member fitting around said flange, and a cap-plate resting on said flange and non-rotatably connected therewith, said cap-plate having lugs on the upper surface thereof.

MATTHEW T. CHAPMAN.

Witnesses:
H. W. SPILLER,
L. W. BENEDICT.